United States Patent
Aflalo et al.

(10) Patent No.: US 10,158,815 B2
(45) Date of Patent: Dec. 18, 2018

(54) METHOD AND SYSTEM FOR BAD PIXEL CORRECTION IN IMAGE SENSORS

(71) Applicant: SAMSUNG ELECTRONICS CO., LTD., Suwon-si, Gyeonggi-do (KR)

(72) Inventors: Yonathan Aflalo, Tel Aviv (IL); Nathan Henri Levy, Givatayim (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 4 days.

(21) Appl. No.: 15/421,874

(22) Filed: Feb. 1, 2017

(65) Prior Publication Data

US 2018/0020173 A1    Jan. 18, 2018

(30) Foreign Application Priority Data

Jul. 18, 2016   (KR) .................. 10-2016-0090853

(51) Int. Cl.
| | |
|---|---|
| *H04N 5/367* | (2011.01) |
| *H04N 9/04* | (2006.01) |
| *G06T 3/40* | (2006.01) |
| *G06K 9/62* | (2006.01) |
| *H04N 5/378* | (2011.01) |
| *G06T 7/90* | (2017.01) |

(52) U.S. Cl.
CPC ........... *H04N 5/367* (2013.01); *G06K 9/6202* (2013.01); *G06K 9/6298* (2013.01); *G06T 3/4015* (2013.01); *G06T 7/90* (2017.01); *H04N 9/045* (2013.01); *H04N 2209/045* (2013.01)

(58) Field of Classification Search
CPC ........ H04N 5/367; H04N 9/045; H04N 5/378; H04N 2209/045; G06T 7/90; G06T 3/4015; G06T 3/4007; G06K 9/6202; G06K 9/6298
See application file for complete search history.

(56) References Cited

U.S. PATENT DOCUMENTS

| | | | |
|---|---|---|---|
| 6,741,753 B1 | 5/2004 | Moroney | |
| 7,015,961 B2* | 3/2006 | Kakarala | G06T 3/4015 348/222.1 |
| 8,441,562 B1 | 5/2013 | Szedo et al. | |
| 8,913,163 B2* | 12/2014 | Seo | H04N 5/367 348/246 |
| 2009/0040343 A1* | 2/2009 | Kao | H04N 5/3675 348/246 |
| 2010/0034481 A1* | 2/2010 | Forutanpour | H04N 5/367 382/275 |
| 2016/0142659 A1* | 5/2016 | Shin | H04N 5/367 348/246 |

* cited by examiner

*Primary Examiner* — Luong T Nguyen
(74) *Attorney, Agent, or Firm* — F. Chau & Associates, LLC

(57) ABSTRACT

A method of detecting a bad pixel in an image sensor includes: determining, a first color of a center pixel of a Bayer patch output by the image sensor; extracting, a main patch, a first auxiliary patch, and a second auxiliary patch from the Bayer patch, having the first color, a second other color, and a third other color, respectively; generating a normalized patch of the first color from the main patch and the auxiliary patches that brings a level of the auxiliary patches to a level of the main patch; and detecting whether the center pixel of the Bayer patch is a bad pixel using the normalized patch.

20 Claims, 7 Drawing Sheets

| 50 | 60 | 60 | 70 | 50 |
|---|---|---|---|---|
| 300 | 200 | 300 | 200 | 300 |
| 90 | 80 | 70 | 80 | |
| 200 | 300 | 300 | 200 | 300 |
| 10 | 15 | 20 | 30 | 40 |

Normalized Patch (530)

FIG. 6

METHOD AND SYSTEM FOR BAD PIXEL CORRECTION IN IMAGE SENSORS

CROSS-REFERENCE TO RELATED APPLICATION

This application claims priority under 35 U.S.C. § 119 to Korean Patent Application No. 10-2016-0090853, filed on Jul. 18, 2016 in the Korean Intellectual Property Office, the disclosure of which is incorporated by reference herein in its entirety.

BACKGROUND

1. Technical Field

Exemplary embodiments of the present inventive concept relate to image processing, and more particularly to bad pixel correction in image sensors.

2. Discussion of Related Art

A digital camera is a camera that stores pictures in electronic memory. Typically, a digital camera uses an image sensor that converts light into electrical charges. An image sensor detects and conveys information that constitutes an image. Most digital cameras use a charge-coupled device (CCD) image sensor or a complementary metal-oxide-semiconductor (CMOS) image sensor. A CCD image sensor uses a MOS capacitor and a CMOS image sensor relies on diodes or transistors to convert light into electronic signals.

The digital camera includes a lens, one or more filters, and one or more image sensor arrays (e.g., CCD or CMOS). The lens is used to focus light to pass through the filter and onto an image sensor array. Photons passing through each pixel of the filter are sensed by a corresponding pixel sensor in the image sensor array.

However, when one or more of the pixel sensors malfunction, quality of the image captured by the image sensor is greatly reduced. A malfunctioning pixel sensor can be referred to as a bad pixel. Thus, there is a need for a method and system that can correct bad pixels.

SUMMARY

According to an exemplary embodiment of the inventive concept, a method of detecting a bad pixel in an image sensor includes: determining, a first color of a center pixel of a Bayer patch output by the image sensor; extracting, a main patch, a first auxiliary patch, and a second auxiliary patch from the Bayer patch, having the first color, a second other color, and a third other color, respectively; generating a normalized patch of the first color from the main patch and the auxiliary patches that brings a level of the auxiliary patches to a level of the main patch; and detecting whether the center pixel of the Bayer patch is a bad pixel using the normalized patch.

According to an exemplary embodiment of the inventive concept, an apparatus to detect a bad pixel in an image sensor includes a digital signal processor (DSP) configured to determine a first color of a center pixel of a Bayer patch output by the image sensor, extract a main patch, a first auxiliary patch, and a second auxiliary patch from the Bayer patch, having the first color, a second other color, and a third other color, respectively, generate a normalized patch of the first color from the main patch and the auxiliary patches that brings a level of the auxiliary patches to a level of the main patch, and detect whether the center pixel of the Bayer patch is a bad pixel using the normalized patch.

According to an exemplary embodiment of the inventive concept, a digital camera includes an image sensor, a Bayer filter, an analog to digital converter configured to convert intensity of light sensed by the image sensor that passes through the Bayer filter into a Bayer patch, a storage device storing a table indicating which pixels of the image sensor are corrupted, and a digital signal processor (DSP) configured to extract a main patch, a first auxiliary patch, and a second auxiliary patch from the Bayer patch, having a first color, a second other color, and a third other color, respectively, generate a normalized patch of the first color from the main patch and the auxiliary patches that brings a level of the auxiliary patches to a level of the main patch, and update the table based on the normalized patch.

BRIEF DESCRIPTION OF THE DRAWINGS

The present inventive concept will become more apparent by describing in detail exemplary embodiments thereof with reference to the attached drawings, in which:

FIG. 6 illustrates an example of interpolation that can be performed on the normalized patch to determine whether a center pixel of the normalized patch is a bad pixel.

DETAILED DESCRIPTION

Figure 1:
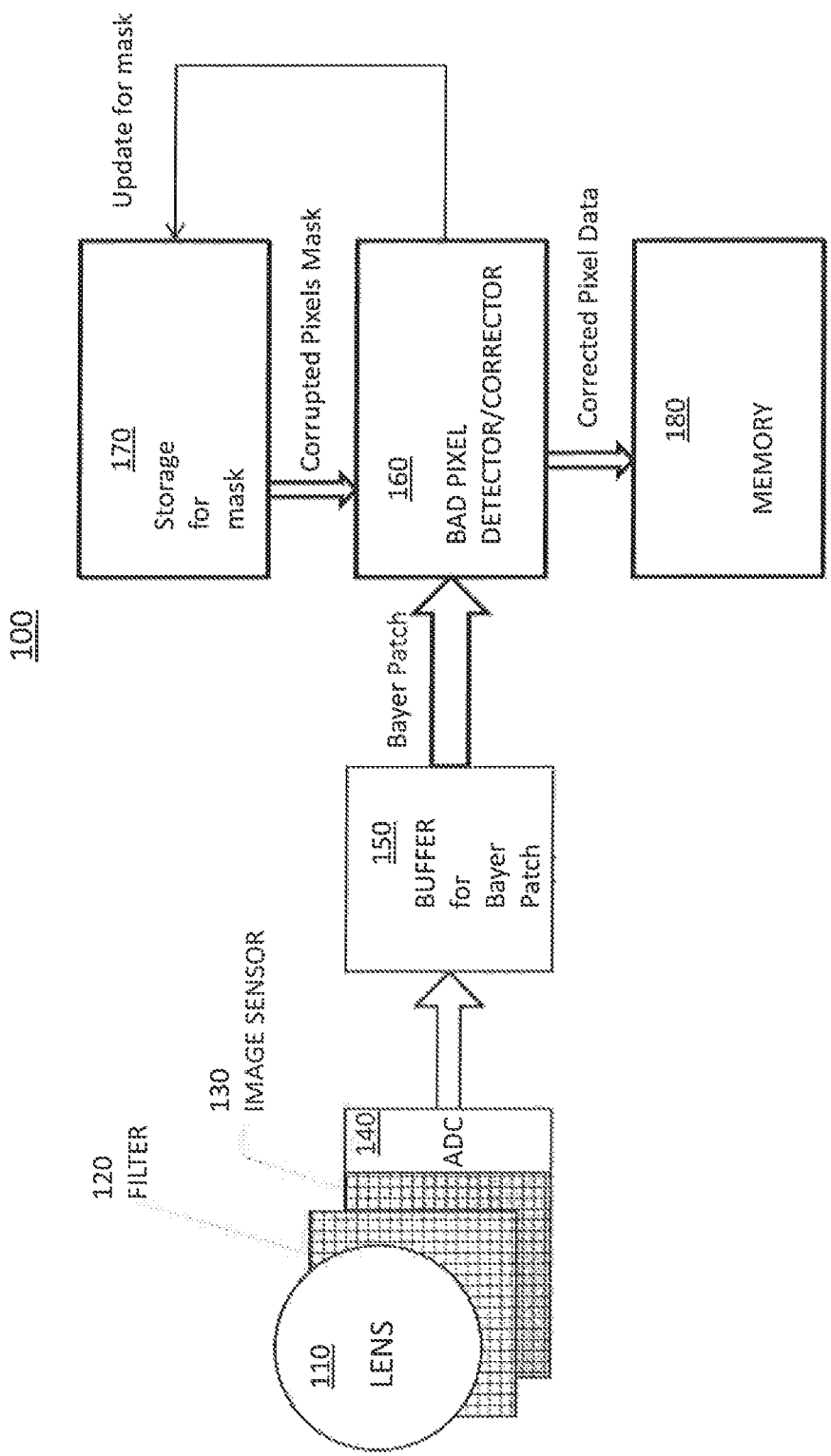
FIG. 1 is a block diagram illustrating a digital camera according to an exemplary embodiment of the inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

At least one embodiment of the inventive concept brings the level of two auxiliary channels of a Bayer Pattern patch to that of the central channel to generate a normalized patch that allows local information to be extracted from two auxiliary channels for the main channel. To do so, an energy that tries to make the normalized patch as smooth as possible is minimized. The minimization may ignore the corrupted pixels and take into consideration a main direction detected in the patch.

FIG. 1 illustrates a digital camera 100 according to an exemplary embodiment of the inventive concept. The digital camera includes a lens 110, a Bayer filter 120, an image sensor array 130, an analog-to-digital converter (ADC) 140, a buffer 150 for storing one or more Bayer Patches, a bad pixel detector/corrector 160 for detecting bad pixels in the Bayer Patches and correcting the bad pixels, a storage device 170 for storing a corrupted pixels mask, and a memory device 180 for storing corrected pixel data. The image sensor array 130 includes a two-dimension array of multiple image pixels, which convert light into electrons. The bad pixel detector/corrector 160 may be implemented by a digital signal processor (DSP). The image sensor array 130 may be a CCD or a CMOS device as an example. While the butler 150, the storage device 170 and the memory 180 are shown as three separate devices in FIG. 1, the inventive concept is not limited thereto. For example, a single memory device may he used to store the Bayer Patches, the corrupted pixels mask and the corrected pixel data.

In an exemplary embodiment, the lens 110 focuses light to pass through the Bayer filter 120 and onto the image sensor array 130. The light passing through each pixel of the Bayer filter 120 are sensed by a corresponding pixel sensor in the image sensor array 130. The ADC 140 converts the intensity of the light sensed by the image sensor array 130 into corresponding digital pixel data, which may be referred to as a Bayer Patch or Bayer Patch data.

Figure 2:
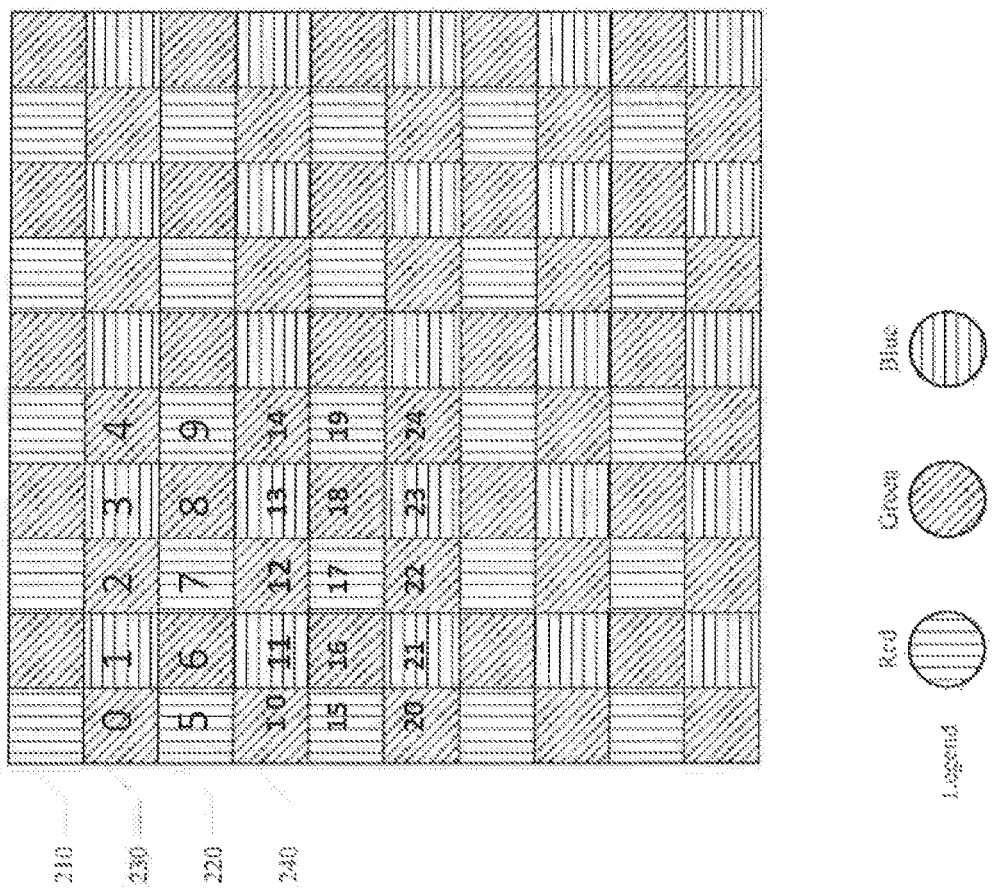
FIG. 2 illustrates an example of a Bayer filter of the digital camera.

FIG. 2 illustrates an example of a Bayer filter 120. The Bayer filter pattern alternates rows of red and green filters 210, 220 with rows of blue and green filters 230, 240. The Bayer filter 120 interleaves the red, green and blue color filters so that each pixel only senses one color, and in any 2×2 pixel cluster on the sensory plane, there are always two pixels sensing green information, one pixel for red, and one for blue. When the bad pixel detector/corrector 160 is implemented by the DSP, a part of the DSP may be used to perform a demosaic algorithm, which interpolates the other two color components for each pixel from the surrounding raw pixel data. For example, if a given pixel generates a red signal, the demosaic algorithm interpolates a green and a blue color signal from the surrounding raw pixel data.

The buffer 150, storage device 170, or memory device 180 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units.

Figure 3:
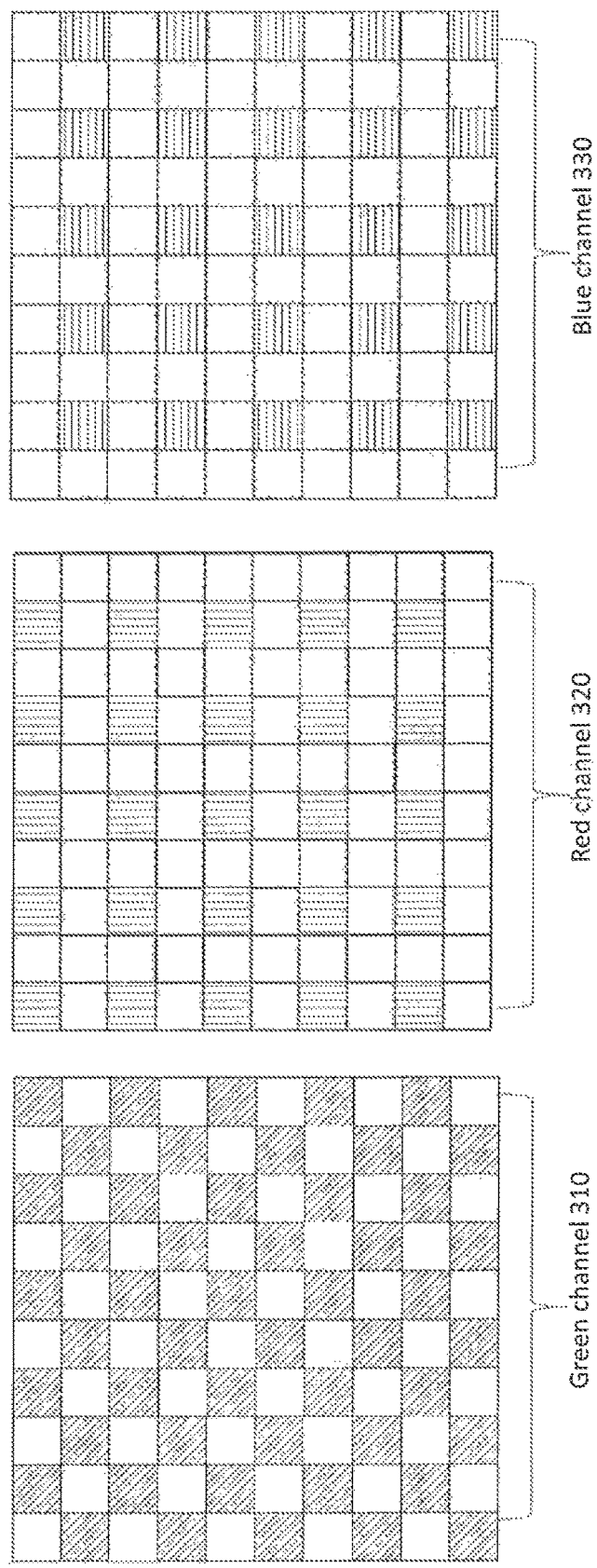
FIG. 3 illustrates an example of a Bayer Patch being split into constituent color channels or patches.

FIG. 3 illustrates data of a Bayer Pattern Patch being broken into its constituent channels, i.e., a green channel 310, a red channel 320, and a blue channel 330. When a Bayer Pattern Patch is being analyzed with respect to one of the three channels, that one channel is referred to as the main channel and the other two channels are referred to as the auxiliary channels. In an exemplary embodiment of the inventive concept, the bad pixel detector/corrector 160 normalizes the two auxiliary channels of a Bayer Pattern Patch to the main channel to generate a new patch, which can be used to detect a bad pixel. In at least one embodiment of the inventive concept, the new patch is determined by minimizing the energy that tries to make the new patch as smooth as possible, while ignoring the pixels that are already corrupted, and taking into consideration a main direction detected in the main channel.

If a given pixel of a certain color (e.g., green) in a Bayer sensor (e.g., 130) is malfunctioning, in order calculate its missing information, it is useful to extract all possible information from a close neighborhood to the given pixel, including pixels that are of another color (e.g., red and/or blue). In an exemplary embodiment of the inventive concept, the information extraction from direct neighbors belong to an auxiliary channel is made possible through an affine transformation that locally adjusts the level of neighboring pixels to the level of a central pixel of the main channel.

Figure 4:
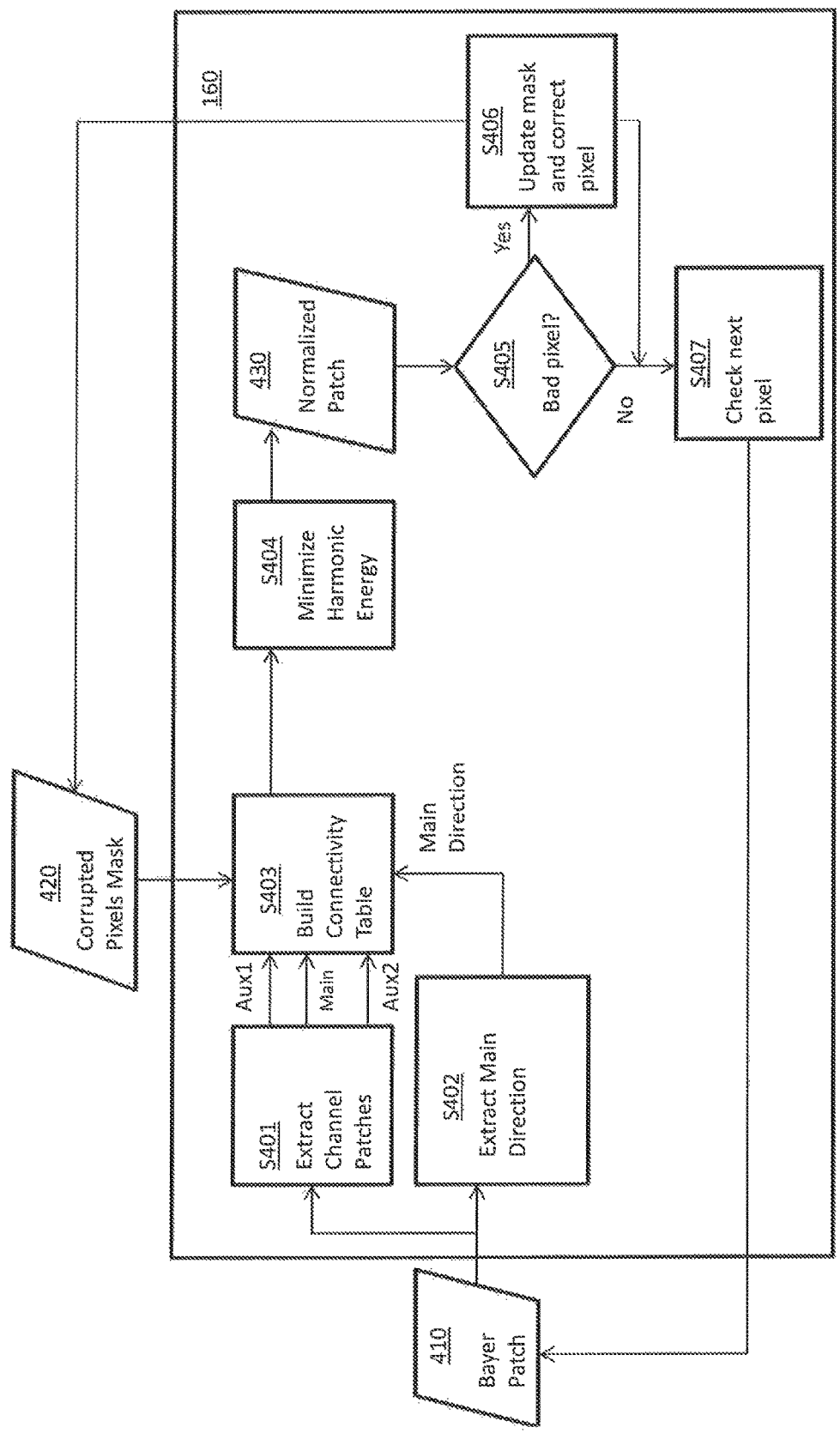
FIG. 4 illustrates a block diagram of a bad pixel detector/corrector of the digital camera according to an exemplary embodiment of the inventive concept.

FIG. 4 illustrates a method performed by the bad pixel detector/corrector of FIG. 2 according to an exemplary embodiment of the inventive concept.

Figure 5:
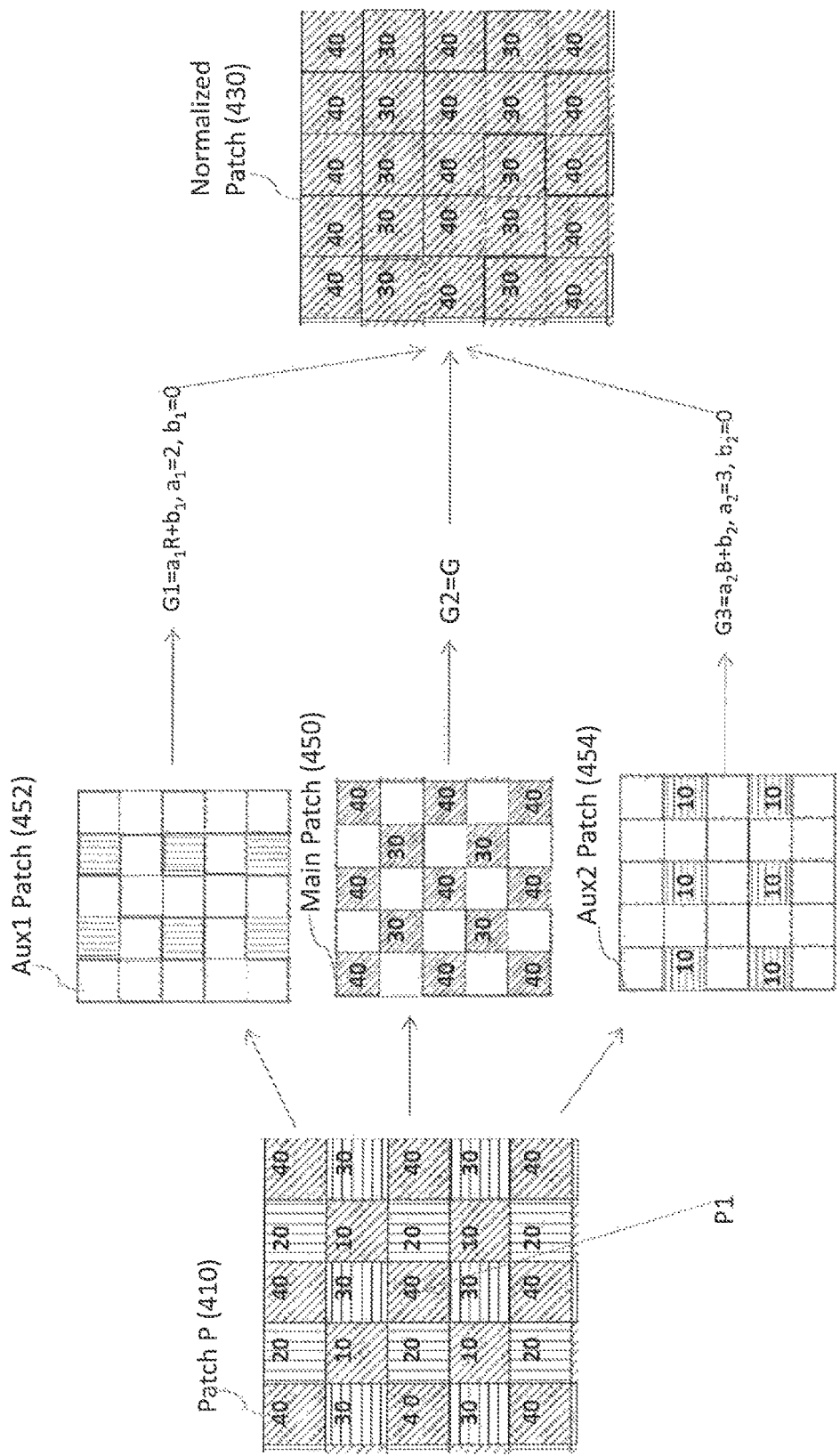
FIG. 5 illustrates a normalized patch being generated from a portion of the Bayer Patch of FIG. 2 according to an exemplary embodiment of the inventive concept.

The method includes extracting of the individual channel color patches from a given Bayer pattern Patch 410 (e.g., Patch P) that was captured by the image sensor array 130 (S401). As shown in FIG. 5, the extracting is based on the color of a central pixel P1. The extracting results in Main patch 450 corresponding to the color of the central pixel P1, an Aux1 patch 452 corresponding to a first color of the Bayer pattern Patch 410 other than the color of the central pixel P1, and an Aux2 patch 454 corresponding to the remaining color of the Bayer pattern Patch 410. For example, FIG. 5 shows that the central pixel P1 is a green pixel, and accordingly the color of the Main patch 450 is green, the color of the Aux1 patch 452 is red, and the color of the Aux2 patch 454 is blue.

The method further includes extraction of a Main direction d from the Bayer pattern patch 410 (S402). The extraction of the Main direction d may occur before the individual color patches are extracted or at the same time. For example, an algorithm may be applied to determine whether the Bayer pattern Patch 410 is considered overall to be an image of a horizontal line, an image of a vertical line, an image of a positive diagonal line (e.g., a forward slash '/') or an image of a negative diagonal line (e.g., back slash '\'). The Main direction d may be determined by using image gradient and/or edge detection algorithms.

Once the main patch and aux patches have been extracted, and the Main direction d has been determined, the method builds a connectivity table (S403). The table includes each of the main patch, the aux 1 patch, and the aux2 patch, and a plurality of pixel intensity difference terms, where each difference term is an adjacent pixel intensity difference among pixels in the Main direction d.

The pixel intensity difference terms are chosen to calculate a weighted harmonic energy over the Main direction d.

For example, if the Main direction d is horizontal h, then the following Equation 1 is used.

$$E_h(P)=\Sigma_{i=1}^{5}\Sigma_{j=1}^{4}\alpha_{i,j+1}^{i,j}(P_{ij}-P_{i(j+1)})^2 \qquad \text{[Equation 1]}$$

The i above represents a row of the patch, the j above represents a column of the patch, $P_{ij}$ represents an intensity of a first pixel, $P_{i(j+1)}$ represents an intensity of a second pixel that is adjacent to the first pixel in the horizontal direction, and each horizontal pixel difference corresponds to $P_{ij}-P_{i(j+1)}$.

For example, if the Aux 1 Patch 452 of FIG. 5 is used, then the table would include a first set of pixel intensity differences for the first row, a second set of pixel intensity differences for the second row, a third set of pixel intensity differences for the third row, a fourth set of pixel intensity differences for the fourth row, and a fifth set of pixel intensity differences for the fifth row. For example, the first set may include a first difference in intensity between pixel 0 and pixel 1, a second difference in intensity between pixel 1 and pixel 2, a third difference in intensity between pixel 2 and pixel 3, and a fourth difference in intensity between pixel 3 and pixel 4.

For example, if the Main direction d is vertical v, then the following Equation 2 is used:

$$E_v(P)=\Sigma_{j=1}^{5}\Sigma_{i=1}^{4}\alpha_{i+1,j}^{i,j}(P_{ij}-P_{(i+1)j})^2 \qquad \text{[Equation 2]}$$

$P_{ij}$ represents an intensity of a first pixel, $P_{(i+1)j}$ represents an intensity of a second pixel that is adjacent to the first pixel in the vertical direction, and each vertical pixel intensity difference corresponds to $P_{ij}-P_{(i+1)j}$.

For example, if the Aux 1 Patch 452 of FIG. 5 is used, then the table would include a first set of vertical pixel intensity differences for the first column, a second set of vertical pixel intensity differences for the second column, a third set of vertical pixel intensity differences for the third column, a fourth set of vertical pixel differences for the fourth column, and a fifth set of vertical pixel intensity differences for the fifth column. For example, the first set may include a first difference in intensity between pixel 0 and pixel 5, a second difference in intensity between pixel 5 and pixel 10, a third difference in intensity between pixel 10 and pixel 15, and a fourth difference in intensity between pixel 15 and pixel 20.

For example, if the Main direction d is a forward slash s, then the following Equation 3 is used:

$$E_s(P)=\Sigma_{i=1}^{4}\Sigma_{j=2}^{5}\alpha_{i+1,j-1}^{i,j}(P_{ij}-P_{(i+1)(j-1)})^2 \quad \text{[Equation 3]}$$

$P_{ij}$ represents an intensity of a first pixel, $P_{(i+1)(j-1)}$ represents an intensity of a second pixel that is adjacent to the first pixel in a diagonal direction that slants to the right, and each corresponding diagonal pixel difference corresponds to $P_{ij}-P_{(i+1)(j-1)}$.

For example, if the Aux 1 Patch 452 of FIG. 5 is used, then the table would include a first set of pixel intensity differences for the first forward diagonal, a second set of pixel intensity differences for the second forward diagonal, a third set of pixel intensity differences for the third forward diagonal, a fourth set of pixel intensity differences for the fourth forward diagonal, a fifth set of pixel intensity differences for the fifth forward diagonal. For example, one of the sets may include a first difference in intensity between pixel 20 and pixel 16, a second difference in intensity between pixel 16 and pixel 12, a third difference in intensity between pixel 12 and pixel 8, and a fourth difference in intensity between pixel 8 and pixel 4.

The pixel difference terms when the Main direction d is the backward slash b may be calculated in a similar manner to the description provided above for the forward slash direction using the following Equation 4:

$$E_b(P)=\Sigma_{i=1}^{4}\Sigma_{j=1}^{4}\alpha_{i+1,j+1}^{i,j}(P_{ij}-P_{(i+1)(j+1)})^2 \quad \text{[Equation 4]}$$

In exemplary embodiment, the building of the connectivity table also considers the input of the corrupted pixels mask 420, which indicates whether one or more of the pixels of the image sensor array 130 corresponding to the analyzed Bayer pattern patch are malfunctioning or are corrupted. For example, when the Bayer pattern patch 410 is 5×5 as shown in FIG. 5, the mask 420 is a 5×5 matrix, where a value in the matrix is 0 when the corresponding pixel is known to be malfunctioning/corrupted or a 1 when the pixel is known to be functioning normally. Thus, the building of each pixel intensity difference term of the connectivity table includes multiplying each pixel intensity difference by a mask value α calculated from the mask 420. For example, a first difference among pixels 0 and 1 (i.e., intensity of pixel 0-intensity of pixel 1) is multiplied by a mask value α of 1 if the mask 420 indicates both pixels are not malfunctioning and otherwise multiplied by a mask value α of 0 if the mask 420 indicated any one of the pixels is malfunctioning. The above shown harmonic energy equations include the mask value α. Whenever the mask value α is 0, the above shown harmonic energy equations simplify since the corresponding pixel difference term will zero out. If there is no information on whether any of the pixels are malfunctioning/corrupted, the mask value α is always 1 and can be omitted from the above equations.

Once the harmonic energy equation corresponding to the Main direction d has been setup based on the determined pixel intensity differences and mask values α, a minimization is performed (S404). The minimization includes creating a quadratic minimization problem (e.g., quadratic minimization problem). The below Equation 5 shows the problem created using patch 410, which includes a green central pixel.

$$\min_{a_1,a_2,b_1,b_2} E_d(P_g+a_1P_r+b_1 1_r+a_2P_b+b_2 1_b) \quad \text{[Equation 5]}$$

The goal is to find the four coefficients $a_1$, $a_2$, $b_1$, $b_2$ such that for a given direction d∈{h, v, s, b}, the above equation is minimized. The parameter $1_r$ represents a patch filled with 1 on the positions that correspond to red (e.g., see positions 1, 3, 11, 13, 21, 23 of FIG. 2) and zero everywhere else, and $1_b$ represents a patch filled with 1 on the positions that correspond to blue (e.g., see positions 5, 7, 9, 15, 17, 19 of FIG. 2) and zero everywhere else. The above problem leads to a quadratic minimization problem, whose four variables $a_1$, $a_2$, $b_1$, and $b_2$ can be represented by a vector v, that reads $\min_v v^T M v + b^T v$, where M is a matrix whose coefficients depend on the green patch Pg (450), the red patch Pr (452), and the blue patch Pb (454), and the direction d. The solution of the above problem is given Equation 6 as follows:

$$v=(M^T M)^{-1}M^T b \quad \text{[Equation 6]}$$

FIG. 5 shows an example of the solving of the above problem, when the Main direction d is the horizontal direction, and all of the mask values a are 1, thereby producing coefficients of $a_1=2$, $a_2=3$, $b_1=0$, $b_2=0$. The result produces a normalized patch 430. As shown in FIG. 5, the red level of 20 in the first row of the red patch 452 has been brought up to the level 40 of the adjacent green pixels, and the blue level of 10 in the second row of the blue patch 454 has been brought up to the level 40 of the adjacent green pixels. The center pixel of the normalized patch 430 is then compared to all of the other pixels of the normalized patch to determine whether the center pixel is bad (S405). Since the horizontal direction was used to generate the normalized patch 430, a horizontal line of neighbor pixels about the center pixel in the normalized patch 430 excluding the center pixel can be used to determine whether the center pixel is bad. In an embodiment, an interpolation is performed on the neighbor pixels. For example, the interpolation may include calculating an average value of the intensities of pixels 10, 11, 13, and 14 along the central horizontal line. If the average value is the same as the intensity of the center pixel or within a threshold, it can be concluded that the center pixel is good. In this example, since the average value of 40 is the same as the intensity of the center pixel, it can be concluded that the center pixel is good.

In another embodiment, the interpolation performs the interpolation by attempting to fit a line (linear interpolation) through intensities of the neighbor pixels. FIG. 6 shows an example, where the normalized patch 530 was generated using the vertical direction, and the linear interpolation has concluded that the intensity is increasing by 10 for each pixel along the central vertical line. Thus, the linear interpolation would conclude that the center pixel is likely to be 70. If the threshold is 5, and the actual value of the center pixel is 60, then it would be concluded that the center pixel is bad. However, if the actual value of the center pixel were 68, then it would be concluded that the center pixel is good.

If it is concluded that the center pixel is bad, then the corrupted pixels mask 420 is updated to indicate that the pixel is bad and/or the pixel data associated with the center pixel is corrected (S406). The pixel correction may be performed using the result of the above described linear interpolation. For example, if the linear interpolation concluded that the center pixel with a value of 60 should have instead been 70, then the pixel data associated with the center pixel of patch 410 can be updated from 60 to 70 and stored in memory 180.

Next, the method may check a new pixel of a new Bayer Patch (S407). For example, the new pixel could be pixel 13 of FIG. 2, where the new patch would include pixels 1-4, 6-9, 11-14, 16-19, 21-24, and the column that is adjacent to pixels 4, 9, 14, 19, and 24. The new corrupted pixels mask 420 is used in the calculation of the new normalized patch. Thus, the corrupted pixels mask 420 may be continually updated. Since pixel 13 is blue, Equation 5 is modified to Equation 6 as follows:

$$\min_{a_1,a_2,b_1,b_2} E_d(P_b+a_1P_r+b_11_r+a_2P_g+b_21_g) \quad \text{[Equation 6]}$$

For example, if the new pixel is pixel 17 of FIG. 2, since pixel 17 is red, Equation 5 is instead modified to Equation 7 as follows:

$$\min_{a_1,a_2,b_1,b_2} E_d(P_r+a_1P_b+b_11_b+a_2P_g+b_21_g) \quad \text{[Equation 7]}$$

For example, when pixel 17 is used, the new Bayer Patch could include pixels 5-24 and a horizontal line of pixels adjacent to pixels 20-24.

Figure 7:
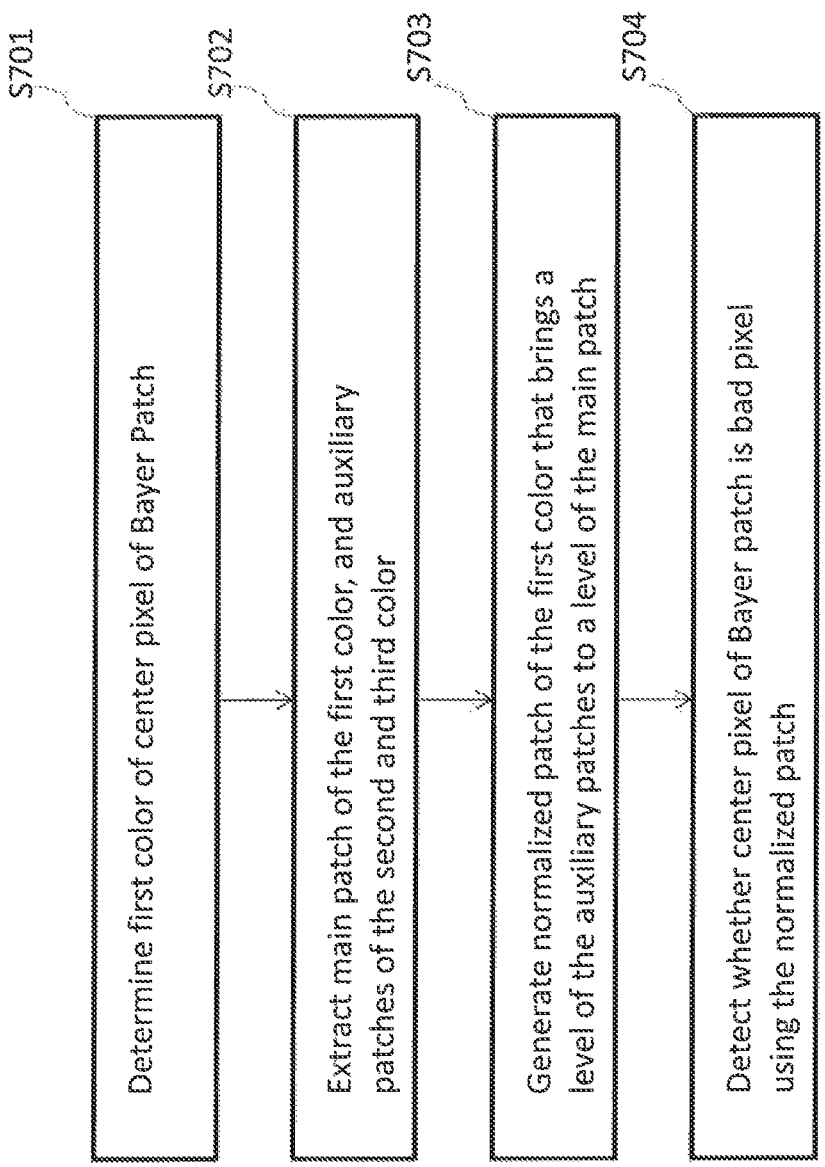
FIG. 7 illustrates a method of detecting whether a pixel of a Bayer Patch is a bad pixel according to an exemplary embodiment of the inventive concept.

FIG. 7 illustrates a method of detecting whether a pixel of the image sensor is a bad pixel, according to an exemplary embodiment of the inventive concept. The method includes determining a first color of a center pixel of a Bayer Patch (S701). For example, as shown in FIG. 2, the center pixel 12 has the color green. The method further includes extracting a main patch of the first color, and auxiliary patches of the second and third color (S702). For example, if the first color is green, then the main patch constitutes the green pixels of the Bayer Patch, the first auxiliary patch constitutes the red pixels of the Bayer Patch, and the second auxiliary patch constitutes the blue pixels of the Bayer Patch. The method further includes generating a normalized patch of the first color that brings a level (e.g., pixel intensity level) of the auxiliary patches to a level of the main patch (S703). example, the pixels of the main patch are left alone and the pixels of the auxiliary patches are adjusted to the level of the neighboring main patch pixels. The method then includes detecting whether the center pixel of the Bayer patch is a bad pixel using the normalized patch (S704). For example, an interpolation may be performed on neighboring pixels of center pixel to generate an estimated intensity value for the center pixel. If the estimated intensity pixel value is close to the actual value (within a certain range) of the center pixel, the pixel of the image sensor associated with the center pixel can be considered a good pixel, and otherwise is considered a bad or corrupted pixel.

In an embodiment, a demosaic algorithm is operated on one or more of the normalized patches to generate a corrected image. For example, the demosaic algorithm can be operated on a red normalized patch to estimate a blue patch and a green patch, and then the red normalized patch can be fused together with the estimated patches to the corrected image. The demosaic algorithm may be used to reconstruct a full color from the incomplete color samples output by the image sensor 130.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

Although the present inventive concept has been described in connection with exemplary embodiments thereof, those skilled in the art will appreciate that various modifications can be made to these embodiments without substantially departing from the principles of the present inventive concept.

What is claimed is:

1. A method of checking whether a pixel in an image sensor is a bad pixel, the method comprising:
    determining, a first color of a center pixel of a Bayer patch output by the image sensor;
    extracting, a main patch, a first auxiliary patch, and a second auxiliary patch from the Bayer patch, having the first color, a second other color, and a third other color, respectively;
    generating a normalized patch of the first color from the main patch and the auxiliary patches that brings a level of the auxiliary patches to a level of the main patch; and
    detecting whether the center pixel of the Bayer patch is the bad pixel using the normalized patch.

2. The method of claim 1, wherein the detecting comprises:
    performing a linear interpolation on pixels of the normalized patch neighboring a center pixel of the normalized patch to generate an estimated intensity value;
    comparing the estimated intensity value with an actual intensity value of the center pixel of the normalized patch; and
    defining whether the center pixel of the Bayer patch is the bad pixel using a result of the comparing.

3. The method of claim 2, wherein the defining determines the center pixel of the Bayer patch to be the bad pixel when the result indicates a difference between the estimated intensity value and the actual intensity value exceeds a threshold value.

4. The method of claim 1, wherein the generating of the normalized patch comprises:
    determining a main direction of the Bayer patch;
    setting up a quadratic programming problem representing a harmonic energy of the main patch and the auxiliary patches in the main direction;
    determining values of coefficients associated with the auxiliary patches that minimize the quadratic programming problem; and
    generating the normalized patch from the values of the coefficients, the main patch, and the auxiliary patches.

5. The method of claim 4, wherein the quadratic programming problem comprises a first term representing a harmonic energy of the first auxiliary patch in the main direction multiplied by a first coefficient, a second term representing a harmonic energy of the second auxiliary patch in the main direction multiplied by a second coefficient, and third term representing a harmonic energy of the main patch in the main direction.

6. The method of claim 4, wherein generating the normalized patch from the values of the coefficients, the main patch, and the auxiliary patches comprises:
    generating a third auxiliary patch from the first auxiliary patch and the value of the coefficient of the first auxiliary patch;

generating a fourth auxiliary patch from the second auxiliary patch and the value of the coefficient of the second auxiliary patch; and generating the normalized patch by combining the main patch, the third auxiliary patch, and the fourth auxiliary patch.

7. The method of claim 4, wherein the main direction is one of a horizontal direction, a vertical direction, or a diagonal direction.

8. The method of claim 5, wherein each term includes a sum of sub-terms, where each sub-term comprises a squared pixel intensity difference among a pair of pixels adjacent one another in the main direction.

9. The method of claim 8, wherein each sub-term is multiplied by a masking value, wherein the masking value is 0 when one of the pixels is corrupted and 1 when none of the pixels is corrupted.

10. An apparatus for checking whether a pixel in an image sensor is a bad pixel, the apparatus comprising:

a digital signal processor (DSP) configured to determine a first color of a center pixel of a Bayer patch output by the image sensor, extract a main patch, a first auxiliary patch, and a second auxiliary patch from the Bayer patch, having the first color, a second other color, and a third other color, respectively, generate a normalized patch of the first color from the main patch and the auxiliary patches that brings a level of the auxiliary patches to a level of the main patch, and detect whether the center pixel of the Bayer patch is the bad pixel using the normalized patch.

11. The apparatus of claim 10, wherein the DSP performs the detecting by performing a linear interpolation on pixels of the normalized patch neighboring a center pixel of the normalized patch to generate an estimated intensity value, comparing the estimated intensity value with an actual intensity value of the center pixel of the normalized patch, and defining whether the center pixel of the Bayer patch is the bad pixel using a result of the comparing.

12. The apparatus of claim 10, wherein the DSP determines the center pixel to be the bad pixel when the result indicates a difference between the estimated intensity value and the actual intensity value exceeds a threshold value.

13. The apparatus of claim 10, wherein the DSP generates the normalized patch by determining a main direction of the Bayer patch, setting up a quadratic programming problem representing a harmonic energy of the main patch and the auxiliary patches in the main direction, determining values of coefficients associated with the auxiliary patches that minimize the quadratic programming problem, and generating the normalized patch from the values of the coefficients, the main patch, and the auxiliary patches.

14. The apparatus of claim 13, wherein the quadratic programming problem comprises a first term representing a harmonic energy of the first auxiliary patch in the main direction multiplied by a first coefficient, a second term representing a harmonic energy of the second auxiliary patch in the main direction multiplied by a second coefficient, and third term representing a harmonic energy of the main patch in the main direction.

15. The apparatus of claim 14, wherein each term includes a sum of sub-terms, where each sub-term comprises a squared pixel intensity difference among a pair of pixels adjacent one another in the main direction.

16. The apparatus of claim 15, wherein each sub-term is multiplied by a masking value, wherein the masking value is 0 when one of the pixels is corrupted and 1 when none of the pixels is corrupted.

17. The apparatus of claim 16, further comprising a memory storing a mask table including values indicating whether pixels of the image sensor associated with the Bayer patch are corrupted.

18. The apparatus of claim 17, wherein the DSP updates the value in the mask table associated with the center pixel of the Bayer patch to corrupted when the center pixel is detected to be the bad pixel.

19. A digital camera comprising:

an image sensor;

a Bayer filter;

an analog to digital converter configured to convert intensity of light sensed by the image sensor that passes through the Bayer filter into a Bayer patch;

a memory device storing a table indicating which pixels of the image sensor are corrupted; and a digital signal processor (DSP) configured to extract a main patch, a first auxiliary patch, and a second auxiliary patch from the Bayer patch, having a first color, a second other color, and a third other color, respectively, generate a normalized patch of the first color from the main patch and the auxiliary patches that brings a level of the auxiliary patches to a level of the main patch, and update the table based on the normalized patch.

20. The digital camera of claim 19, wherein the DSP updates an entry of the table associated with a first pixel of the image sensor associated with a center pixel of the normalized patch to indicate the first pixel is corrupted when an interpolation performed on neighboring pixels of the center pixel indicate the center pixel is corrupted.

* * * * *